United States Patent [19]

Roberts

[11] Patent Number: 5,701,291
[45] Date of Patent: Dec. 23, 1997

[54] ATM SYSTEMS

[75] Inventor: Larry G. Roberts, Woodside, Calif.

[73] Assignee: The Whitaker Corporation, Wilmington, Del.

[21] Appl. No.: 701,264

[22] Filed: Aug. 22, 1996

[51] Int. Cl.$^6$ ................................................. H04L 12/56
[52] U.S. Cl. ................................. 370/232; 370/390
[58] Field of Search .................................. 370/235, 224, 370/230, 231, 232, 233, 234, 236, 237, 390, 384, 404, 403, 358, 364, 391, 392, 393, 396, 397, 424

[56] References Cited

U.S. PATENT DOCUMENTS

5,276,425  1/1994  Swanson et al. .................... 340/826

*Primary Examiner*—Dang Ton

[57] ABSTRACT

A method using an explicit rate that has a resource management cell 20 on a virtual circuit circling a network on a multicast system, every predetermined number of cells per resource management cell 10. Each switch node 12 computes a rate it can support called the minimum average cell rate. The minimum average cell rate is computed by dividing [the total available bandwidth for a bottlenecked set of virtual circuits multiplied by a constant (a)] by [a total number of bottlenecked virtual circuits multiplied by a variable (t)]. The switch node 12 marks the virtual circuit bottlenecked at that switch node 12. The explicit cell rate of the resource management cell 20 is set to the lower of the two values: the explicit cell rate of the resource management cell when it enters the switch node or the minimum average cell rate. The explicit cell rate of the resource management cell sets explicit cell rate of data cells and resource management cells transmitted by the source node after the source node receives the resource management cell.

11 Claims, 5 Drawing Sheets

ATM SYSTEMS

FIELD OF THE INVENTION

This invention relates generally to the field of computer networks, and particularly to congestion avoidance of data cells transmitted over a computer network.

BACKGROUND OF THE INVENTION

In general terms, a computer network is a collection of end systems interconnected through one or more routers. For more general information regarding computer networks, Applicants incorporate U.S. Pat. Nos. 5,377,327 and 5,313,454 by reference.

Figure 4:
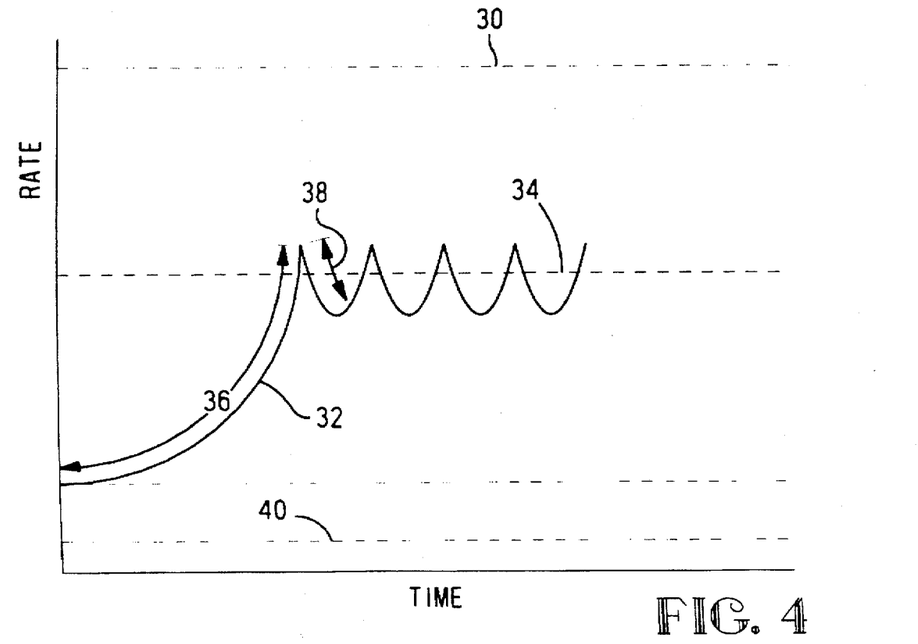
FIG. 4 is a schematic diagram the Rate versus Time for an explicit binary forward path congestion indicator method (EFCI).

Specifically, U.S. Pat. No. 5,377,327 discloses a congestion avoidance system for a computer network utilizing a binary rate method as illustrated in FIG. 4. The binary rate method is operative on the computer network that comprises; a source node, at least one switch node, and a destination node on a network loop. The source node in a binary rate method, transmits data cells along the network loop to the switch node. The data cells as transmitted by the source node initially have a cell rate near the minimum cell rate. The source node increases the cell rate, which is known as the additive up process 36, from the minimum cell rate. The switch node marks a binary congestive indicator bit of a data cell when the switch node determines that the cell rate of the data cell exceeds the congested point of the network 34. The data cells, marked or unmarked, then proceed to the destination node. When the destination node observes the mark on the binary congestive indicator bit of the data cell, the destination node signals the source node that the cell rate of the data cells is exceeding the congested point 34.

The source node operating in a binary rate method increases the data cell rate whenever the source node fails to receive a signal from the destination node. Decreasing the cell rate, known as an multiplicitive-down process 38, of the data cells occurs if the source node receives a signal from the destination node.

A disadvantage of the binary rate method resides in a deficiency in what is known as the fairness of the method, because this method has delays in responsiveness and has a high cell loss. When a cell rate of a data cell exceeds the congestion point of the network, cell loss of the data cell occurs, due to short term overload of the network bandwidth during a delay period of responsiveness, and the lack of adequate buffer capacity. This cell loss can be avoided by improving the fairness, and providing a more responsive system for avoiding congestion on a network.

U.S. Pat. No. 5,313,454 discloses a system for congestion prevention control utilizing an explicit binary, forward path congestive indicator (EFCI) technique. In particular, the system comprises a cell switching communication network designed to handle bursty traffic on a per virtual circuit connection. The system is on a network loop comprising a source node, optional intermediate nodes, and a destination node. The source node is capable of accepting and transmitting data cells to a destination node. The rate of transmission is incrementally controlled by the state of congestion on the virtual network as reported by the destination node to the source node over an existing two-way virtual circuit connection. Intermediate nodes accept and forward the data cells toward the destination node together with an associated incipient congestion indicator located in the byte field of the data cells. Incipient congestion is measured by an intermediate node monitoring the virtual connection queue and buffer lengths. The destination node then receives the data cells together with the congestion indicator, reconstructs and formats the data for delivery to the end user, and counts the received congestion indicators over an adaptive interval. A rate control signal is generated from the congestion indicator count and is supplied upon a feedback circuit.

An advantage of the present invention over the binary rate method in the prior art resides in the explicit cell rate is directly set to the desired rate. Thereby, no time is wasted to oscillate the explicit cell rate to attain the correct rate as required in a binary rate technique. Accordingly, the method of the present invention is 4–10 times faster than a binary rate method.

Another advantage of the present invention over the prior art resides in setting the explicit cell rate on the reverse path on the network loop. By setting the explicit cell rate on the reverse path, the present invention avoids all cumulative time delays of the whole network loop, resulting in the source being controlled 2–4 times faster than any explicit binary forward path congestive indicator technique.

A problem in the above techniques resides in if a source node sends out flow control resource management cells to all branches and all resource management cells return to the source node, the source node and the network loop would be overloaded with too many resource management cells on the reverse path of the network loop.

SUMMARY OF THE INVENTION

A solution to the above identified problem resides in the present invention as well. For each switch node at a branch point of a multicast system, the switch node combines all the resource management cells on the reverse path of the network loop to create only one per time period returning toward the source.

One object of the present invention is to provide a flow control technique for cell formats that is responsive to the changing traffic patterns on a network, particularly with a multicast system.

Another object of the present invention is to provide a flow control technique for a low loss ratio of the cell formats.

Besides the objects listed above for the present invention, a further object of the present invention is to provide a flow control technique for cell formats with inherent fairness in queuing cells.

DRAWING SUMMARY

Embodiments of the invention will now be described with reference to the accompanying drawings, according to which.

DETAILED DESCRIPTION OF THE INVENTION

Figure 1:
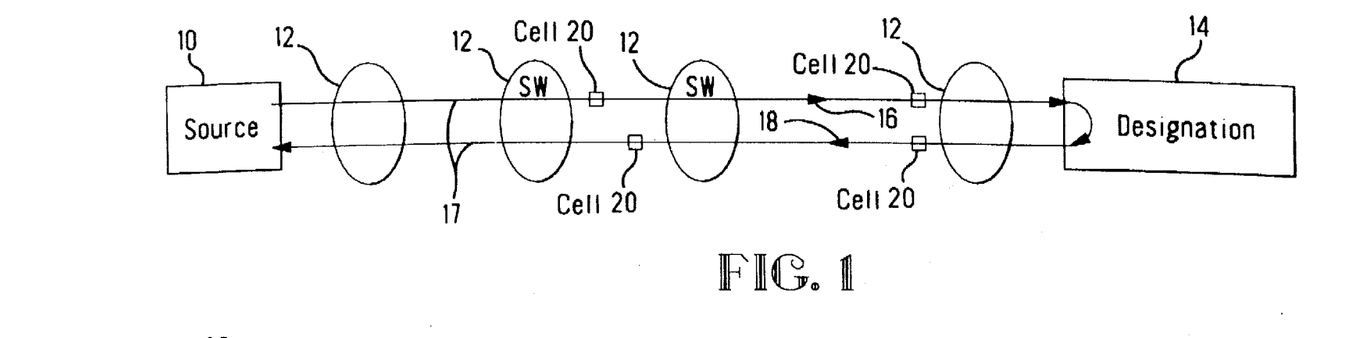
FIG. 1 is a schematic diagram of a network loop with a trunk line.
Figure 2:
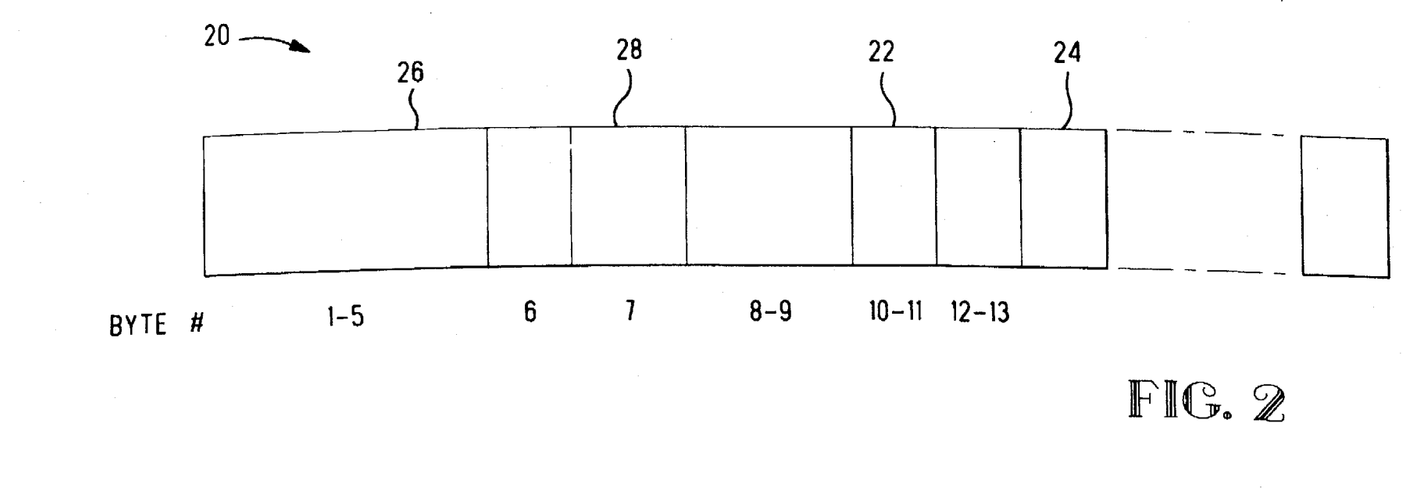
FIG. 2 is a schematic diagram of a byte stream of a resource management cell.
Figure 3:
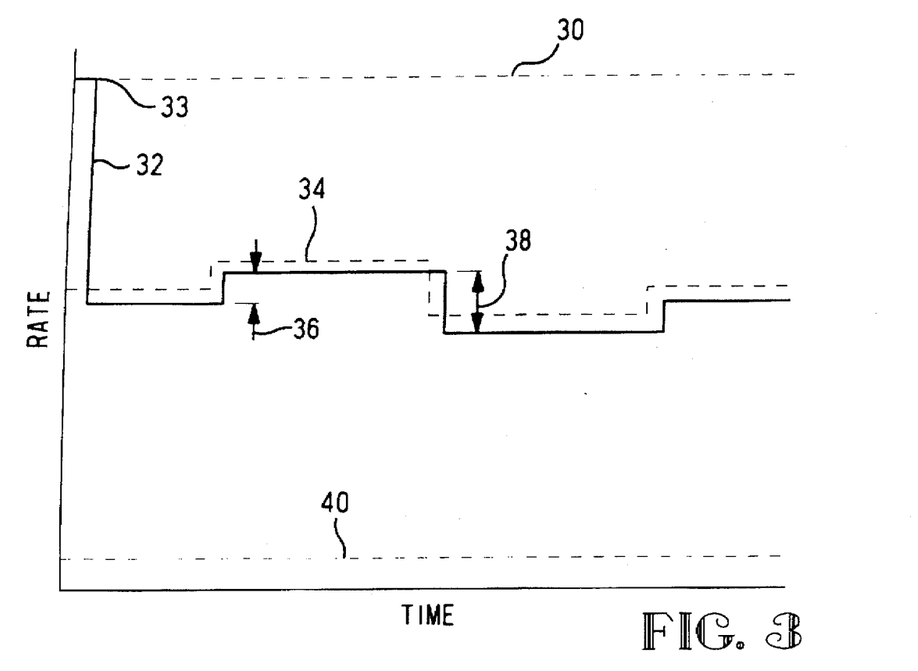
FIG. 3 is a graph of the Rate versus Time for an explicit rate operation.

With reference to FIGS. 1–3, the present embodiment of the invention resides in a method for an explicit rate feedback with intelligent marking to control congestion on a network. It is understood that the network loop 17 illustrated in FIG. 1 is a schematic of at least one or of many trunk lines of virtual circuits illustrated by one line, which trunk lines originate and are received from numerous and various source nodes and destination nodes that have many switch nodes on the schematic network loop.

With reference to FIG. 1, a network loop 17 in a cell switching type network comprises; a source node 10, at least one switch node 12, a resource management cell 20, and a designation node 14.

The source node 10 transmits a resource management cell 20 and other cells, such as data cells. Besides transmitting, the source node 10 also receives each of the resource management cells 20 and the other cells located between the resource management cells 20, such as data cells (not shown).

With reference to FIG. 2, the resource management cell 20 contains byte streams which are further configured with byte fields. A byte field indicating the cell header 26 is present in a resource management cell 20. The cell header 26 indicates the virtual circuit and the virtual circuit connections of the resource management cell 20. The resource management cell 20 has a byte field detailing the current cell rate 22. The current cell rate 22 is the rate the user is operating. The resource management cell 20 also contains a byte field having the explicit cell rate 24 as well. The explicit cell rate 24 is the rate the source node 10 switches to operate.

A resource management cell 20 proceeds on a forward path 16, which is the path indicated by the arrow 16, of the network loop 17 from the source node 10 through a switch node 12 to the destination node 14 and is then returned toward the source node 10 through the switch node 12 on the reverse path 18, which is the path indicated by the arrow 18.

A network switch node 12 marks the resource management cell 20 when the virtual circuit that contains a resource management cell 20 becomes bottlenecked. A bottlenecked virtual circuit is an active virtual circuit that is near or exceeds the maximum allocated bandwidth made available to it. To determine if an active virtual circuit is bottlenecked, the virtual circuit has a value equal to or greater than a value of the switch node, called a minimum average cell rate (MACR). The MACR is a function of the bandwidth of the virtual circuits. The switch node 12 has two embodiments to compute the MACR.

In a first embodiment to compute the MACR, the switch node 12 averages the current cell rate of all resource management cells 20 that proceed through the switch node.

Figure 5:
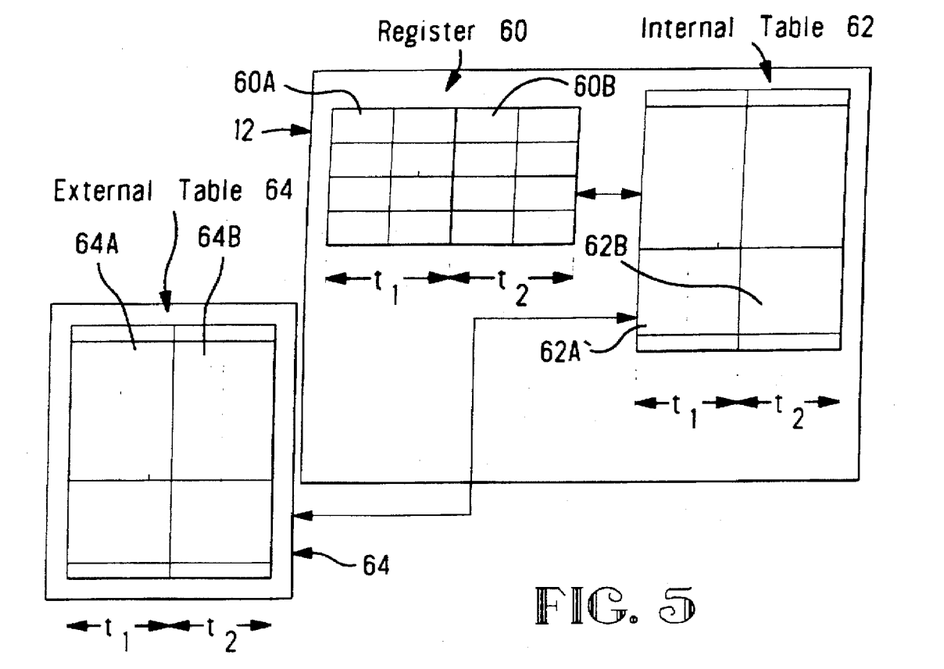
FIG. 5 is a schematic diagram of one embodiment of the switch node.
Figure 6:
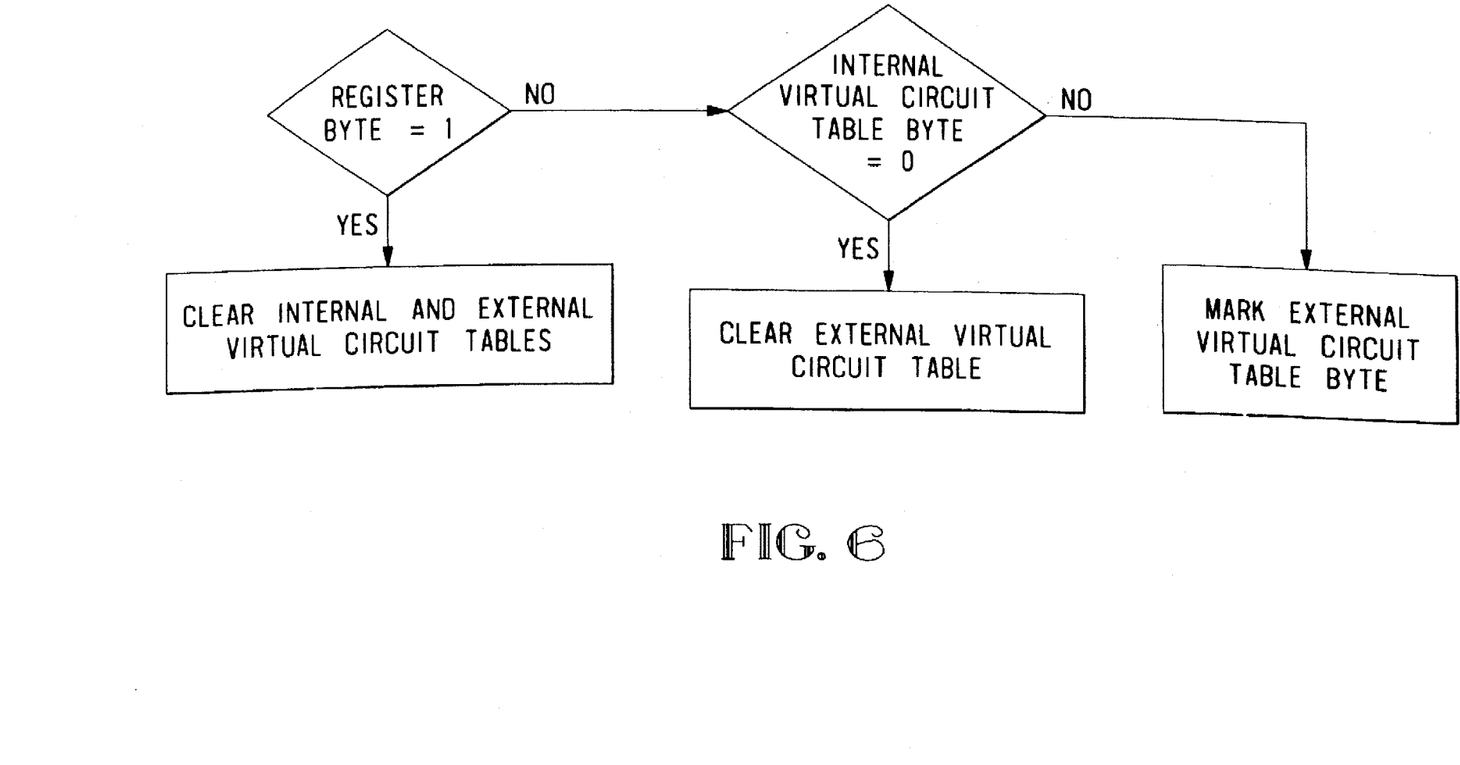
FIG. 6 is a schematic logic diagram of the operation of the switch node shown in FIG. 6.

In the second and preferred embodiment to compute MACR, as illustrated in FIGS. 5 and 6, the MACR is computed by dividing [the total available bandwidth for bottlenecked set of virtual circuits (OUT) and multiplied by a constant (a)] by [the total number of bottlenecked virtual circuits (VCA) multiplied by a variable (t)].

$$MACR = \frac{(a) \; OUT}{(t) \; VCA}$$

The value of (a) is a constant, near one, that is a fraction which is congestion dependent and set by an operator. Thereby, the value of (a) avoids congestion and diminishes any buffer on the network loop to build up.

As for the variable (t), the variable (t) is based on time. The variable (t) is a time frame in seconds (shown as $t_1$ and $t_2$) set by a timer. The timer is dependent on the rate of the virtual circuit line and the rate of the resource management cell 20. In other words, the timer is set by the formula:

$$t = maximum \; \left| \frac{NX}{MACR}, c \right|^{15}$$

wherein NX is a constant. This constant is the number of cells per resource management cells. "c" is a minimum time constant. Each time the timer reaches zero, a new rate, MACR, is computed.

To determine OUT and VCA, the switch node 12 has a register 60, an internal virtual circuit table 62, and an external virtual circuit table 64 to keep track of each active virtual circuit of the possible 16K virtual circuit connections. The register 60 and the internal virtual circuit table 62 are in duplicate (respectfully 60A, 60B and 62A, 62B) on a chip (not shown) of the switch node 12. Likewise, the external virtual circuit table 64 is duplicated (64A, 64B) on an outside memory source like a RAM (not shown).

Each register 60 comprises an eight byte system, divided into a four-by-two matrix. Each internal virtual circuit table 62 comprises a two hundred and fifty six byte system divided into an eight by thirty-two byte matrix. While the external virtual circuit table 64 comprises a 16K byte system. The matrix of the byte system on the register, and both virtual circuit tables can be increase or decreased to accommodate the quantity of virtual circuits.

When a switch node 12 receives a resource management cell 20, the switch node 12 reads the cell header 26 of the resource management cell 20 which identifies the virtual circuit and the virtual circuit connections. The first three bytes of the cell header identify the position on the register 60. Thus, the switch node 12 marks the bit on one of the eight bytes on the register indicating the designated virtual circuit connection. The mark is a binary mark of either one or zero with one indicating there is an active virtual circuit connection.

If the bit on the register 60 is equal to zero, then the internal virtual circuit table 62 and external virtual circuit table 64 are cleared. Clearing occurs by placing a zero in all locations in the internal virtual circuit 62 and the external circuit table 64, except where the virtual circuit connection is presently being designated by the next six bytes of the cell header 26 for the internal virtual circuit table 62 and the last five bytes of the cell header 26 for the external virtual circuit table 64.

If the bit on the register 60 is equal to one and the bit on the internal virtual circuit table 62 is equal to zero, then the external virtual circuit table 64 is cleared as set forth above.

On the other hand, if the bytes on the register 60 and the internal virtual circuit table 62 are equal to one, then the byte on the external virtual circuit table 64 is marked indicating an active virtual circuit connection.

Besides the virtual circuits being counted, the idle cell lapses in the virtual circuits are counted as well. That is, the idle cell count (not shown) is incorporated into the value of OUT as well as the active cells.

This clearing process of the register 60 and tables 62, 64 is able to take place rapidly, because there are duplicates of the register 60 and the tables 62, 64. The duplicates swap with each other after the exterior virtual circuit table (A) 64A is equal to the exterior virtual circuit table (B) 64B. Virtual circuit table (A) 64A then has the virtual circuit count placed into it to be evaluated, while virtual circuit table (B) is cleared for more counts to be placed.

Thereby, the switch node 12 is able to compute the MACR accurately and proficiently.

When the explicit cell rate 24 of the resource management cell 20 on the virtual circuit exceeds a predetermined fraction of the MACR, the virtual circuit is congested.

If the resource management cell 20 is congested at a switch node 12, the switch node 12 will mark the byte field of the resource management cell 20 containing the explicit cell rate 24 by changing the explicit cell rate 24 to indicate the maximum bandwidth available for a virtual circuit which the resource management cell 20 is operating upon. This method is called intelligent marking because the switch node 12 which is congesting the resource management cell 20 will only mark down a specific byte field, explicit cell rate 24 (ER), on the resource management cell 20 that is congested. More specifically, the switch node follows the equation:

$$ER = \text{minimum (ER, MACR)}$$

Figure 7:
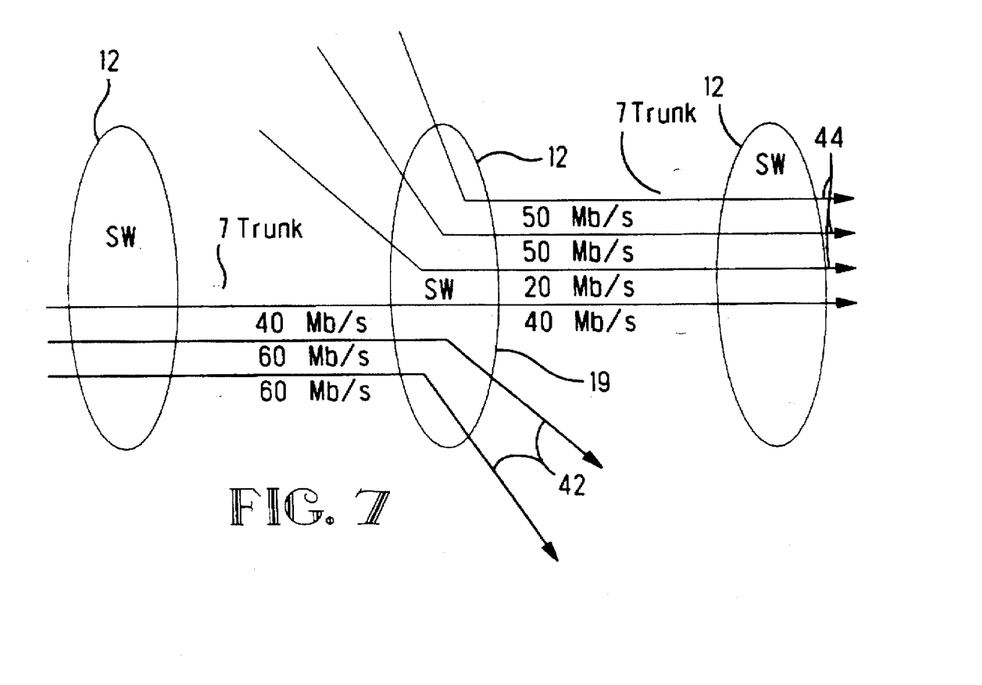
FIG. 7 is a schematic diagram of the switch node splitting up the bandwidth of the virtual circuits.
Figure 8:
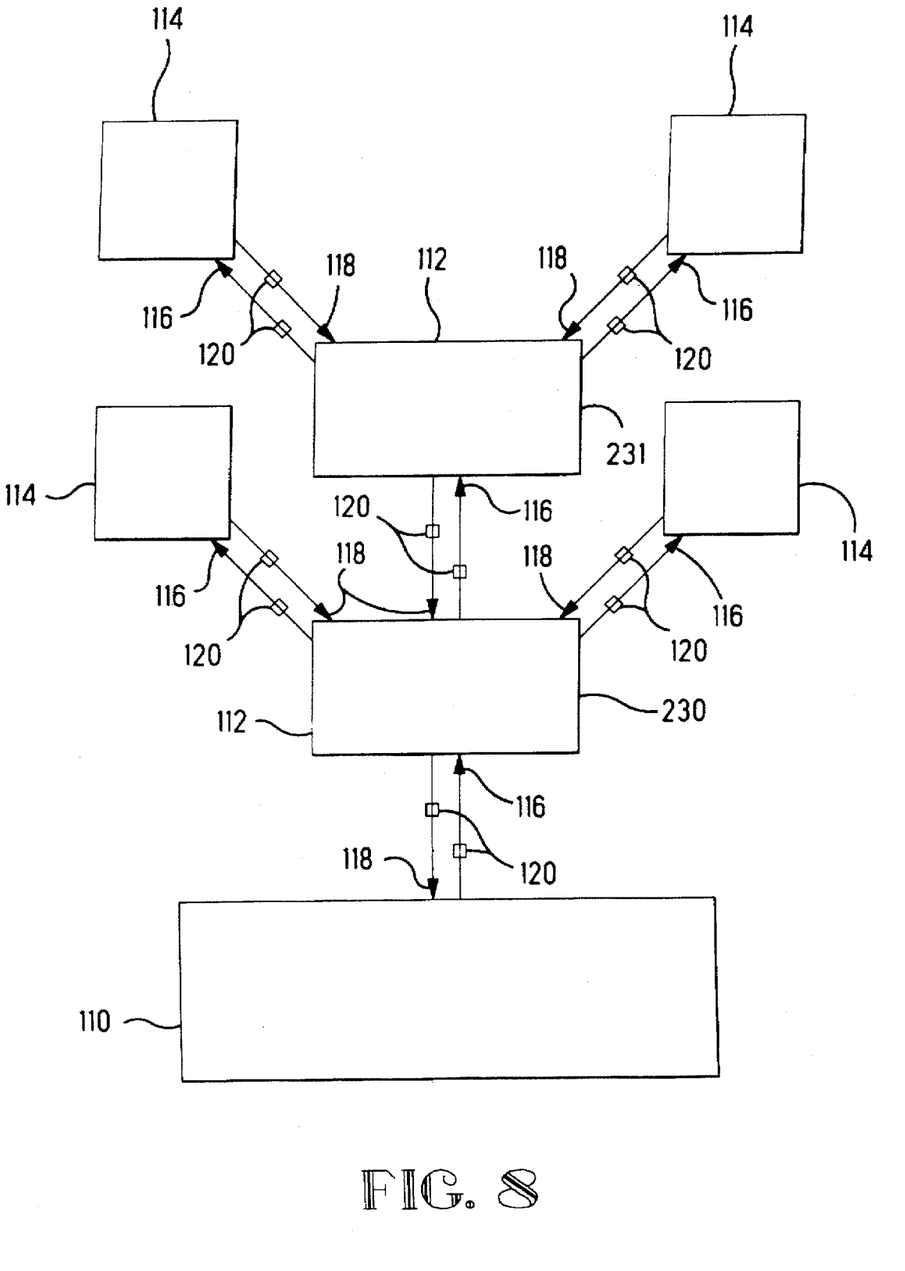
FIG. 8 is a schematic diagram of the multicast system.

By utilizing this equation and as illustrated in FIG. 8, the switch node 19 can split up the total bandwidth of the virtual circuits 42 shown in FIG. 7, that are marked down to the MACR. This split up process can either be done equally (not shown) or differently, see how the bandwidth of the virtual circuits 42 were split up to the bandwidths of the virtual circuits 44 in for example a 160 Mb/s trunk 7, according to some weighting formula (not shown) which for example might be based on the price paid for the network service.

Preferably, it is on the reverse path 18 that marking on the resource management cell 20 occurs. The delay from marking a resource management cell 20 and the source node 10 receiving the resource management cell 20 and changing the explicit cell rate of cells transmitting from the source node 10 is determined by the speed of the light primarily and is typically very short, 100 microseconds across a local area network to 20 ms across a network stretching throughout the United States of America. Thus, the source node 10 operates at a rate that the network can support and the queries on the network remain very short.

The size of the buffer used on the network (not shown) can be set so there is no cell loss in almost all cases. In between receiving resource management cells 20, the source node 10 is required to slow down each time it sends a data cell (not shown) and only increase the explicit cell rate when the source node 10 receives an unmarked resource management cell 20 from the network 17. This slow down, combined with the explicit rate feedback from the network 17, insures that the buffer is configured to insure that no cells, like data cells or resource management cells, are lost by the network 17 through congestion.

The basic elements of the method using the explicit rate is that a resource management cell 20 circles the network, every predetermined number of cells (like 32) per resource management cell 10 and/or predetermined time period, for example 100 ms. Each switch node 12 computes a rate, called the minimum average cell rate value (MACR), it can support in one of the three identified embodiments set forth above.

The switch node 12 marks the byte field of the explicit cell rate of the resource management cell 20 that becomes bottlenecked at that switch node 12 with the minimum value of either the present explicit cell rate or a fraction of the MACR, whichever is lower. Which in turn sets the explicit cell rate of the source node 10. By setting the source node 10 to the minimum of the explicit cell rate 24, good responsiveness is achieved and buffers are minimized.

In greater detail, the cell rate format of a resource management cell 20 is distinct from the standard asynchronous transfer mode cell. The cell rate format of the resource management cell 20 has a mantissa of 9 bits and an exponent of 5 bits. This cell rate format permits $1.8 - 10^{12}$ bits/sec maximum rate. There is also a zero bit, nz, which multiplies the rate.

$$RATE = nz*(1 + mantissa/512)*2^{exponent}.$$

Wherein a 16 bit floating point number is created for the cell rate format of the resource management cell 20.

As for the source node 10 behavior, the source node 10 sends a resource management cell 20 for at least every predetermined number of data cells, like thirty-two, per resource management cell 20 transmitted, and also at least for every 100 ms if data is being transmitted. If there is data to send and more than 100 ms have transpired since the last resource management cell 20 was transmitted then a resource management cell 20 should precede any data cells and the Actual Cell Rate (ACR) should be set to the minimum of the ACR and the Initial Cell Rate 33 (ICR). The source node 10 should not send any cell at a rate exceeding the maximum cell rate 30. The source node 10 however shall send any cell at a rate of at least the minimum cell rate 40. When a source node 10 is initialized, the source node 10 shall set the ACR to the ICR. A source node 10 shall decrease its ACR by at least ACR/reduction factor every predetermined number of cells per resource management cell 20 sent down to the minimum cell rate 40 Mb/s.

The reduction factor is an exponential decrease, like $15/16$ths.

Only when a reverse path 18 of the resource management cell 20 is received into the source node 10 with a congestive indication CI=0, may the source node 10 increase the ACR by an amount, AIR, negotiated at call setup and restore any previous resource management cell 20. Moreover, when a source node 10 receives a reverse path 18 of the resource management cell 20, the source node 10 must set its rate to the minimum explicit cell rate 24 from the resource management cell 20 and the ACR.

The destination node 14 turns all resource management cell 20 received around to return to the source node 10. The direction bit (DIR) is changed from forward to backward at the destination node 14. If a binary congestive indicator bit set is equal to one has been received on the prior data cell, then the destination is marked on the reverse path of the resource management cell 20. The explicit cell rate 24 is set to reduce the rate of the source node 10.

The explicit rate 24 base system has the switch node 12 reducing the explicit rate 24 of a resource management cell 20 on the reverse path 18 of the network loop 17 that was congestive on the network loop 17. The switch node 12 then sets the congestion indication (CI) equal to one in the reverse path 18 of the resource management cell 20 to ensure the source does not increase its rate.

EXAMPLE

As resource management cell 20 flows on the forward path 16 of the network loop 17 from the source node 10 to the destination node 14, the switch node 12 computes an estimate of the bottleneck rate, known also as the minimum average cell rate (MACR), which the cell will encounter.

As the resource management cell 20 travels on the reverse path 18 of the network loop 17 from the destination node 14 to the source node 10, the switch node 12 modifies the explicit cell rate, 24, field of the resource management cell 20.

If congested then explicit cell rate (ER)=Minimum of (ER, MACR*15/16)
Thus, the source rate is set under the congestion rate of the switch node 12.

In the worst case scenario of this system. The system has many virtual circuits (not shown) that start sending resource management cells 20 and data cells, not shown, at the same time. If a number of virtual circuits (N) start sending these cells, the maximum queue is equal to 40(N−1). The probability of N virtual circuits starting with 40 cell times, given 4000 total virtual circuits is

| k  | Probability | Qmax |
|----|-------------|------|
| 6  | $10^{-14}$  | 200  |
| 10 | $10^{-25}$  | 360  |
| 20 | $10^{-54}$  | 780  |

Thus, without a large buffer, the explicit mode can support available bit rate with close to zero cell loss.

Seventeen bits are needed for each virtual circuit 48; sixteen to accumulate a minimum rate and 1 to accumulate the congestion bit. In either case, the extra logic and buffer memory required is rather minimal.

Expanding this simple network loop into a multicast system is another aspect of the present invention as representatively illustrated in FIG. 8. In the multicast system, there are numerous source nodes 110 (only one shown for simplicity), commonly called a root, that transmits all data cells (not shown) and resource management cells 120. There are various switch nodes 112 each commonly called a branch point on the multicast system. Moreover, there are numerous destination nodes 114 each commonly called leafs on the multicast system.

A resource management cell 120 travels from the root 110 to branch point 230; and the branch point makes a copy of the resource management cell 120 that travels from branch point 230 to branch point 231 or any branch point to a leaf 116 on a forward path of the network. The branch point that receives a resource management cell or a copy of said cell 120 on a forward path, indicated by the arrows 116 on the network, alters the directional bit field 28 in FIG. 2, in the cell 120 from a forward to a reverse direction. Each branch point also copies the resource management cell 120 and sends the copies of the resource management cell 120 to the branches of the branch point. The branches may lead to another branch point or a leaf.

Meanwhile, the branch point also makes an extra duplicate of the cell 120 that is received on the forward path by the switch node and the cell 120 is marked reverse, and sends the extra duplicate cell 120 to the prior transmitting node, upstream (root or branch point depending upon the position of the branch point). This extra duplicate of the cell (which can be a copy or the original) is made because when a resource management cell on the forward path 116 is received by a branch point, the branch point tosses or discards the cell 120 on the forward path 116 and clears the storage of the cell unless the branch point counter (not shown) is equal to zero. If the branch point counter is equal to zero, the cell on the forward path is passed up on the reverse path, as indicated by the arrow 118, to the root or a branch point located upstream; and the branch point counter is reset to a predetermined value (N). The value (N) of each counter of a branch point is counted down by one every time a cell on the forward path 116, transmitted from the root 110 or another upstream branch point, is received by that branch point that contains that counter. Thus, the cell 120 on the reverse path of the network 118 from the leaves are reduced to 1/N of the cells 120 from the root or upstream branch point.

When a copy of the resource management cell 120 is received by a leaf or branch point, the copy of the resource management cell 120 is returned to the branch point that transmitted the copy of the resource management cell 120. The branch point that transmitted the copy of the resource management cell accumulates the minimum explicit cell rates 24 of a resource management cell 120 returning from a leaf or branch point between two packet transmissions on a forward path (not shown) on a table (not shown).

The branch point that receives the copy of the cell on the reverse path of the network and receives an extra duplicate of the cell on the reverse path of the network, accumulates the minimum explicit cell rate of each received cell on the reverse path. The branch point then sets the minimum explicit cell rate 24 (ER) of the extra duplicate cell 120 that is sent by the switch node on the reverse path by the following formula:

$$\text{Minimum (prior minimum ER, c, or ER of a cell received by the switch node on the reverse path of the network)}$$

wherein c is a predetermined constant. Moreover, other byte fields may be adjusted in a similar manner as the explicit cell rate of a field. Such other byte fields include the minimum of congestive indicator byte field or minimum of "no increase" byte field.

After the explicit cell rate of a cell, such as a copy of a resource management cell and an extra duplicate of the resource management cell, on the reverse path, received by a switch node is accumulated, every cell on the reverse path of the network received by the switch node is tossed or discarded.

Besides the branch point setting the extra duplicate of the resource management cell with the minimum explicit cell rate, the branch point also sets the extra duplicate of the resource management cell with the combined information accumulated from the data cells (not shown) on the reverse path 118. The combined information can be the minimum information the bandwidth of the trunk on the network can support; the maximum information the bandwidth of the trunk the network can support; a standard deviation from a mean of information the bandwidth of the trunk of the network can support; or any predetermined ratio of the combined information the bandwidth of the trunk of the network can support.

The extra duplicate resource management cell is then sent to either another switch point or the root. By repeating the above identified procedures, the root is ultimately set with the minimum explicit cell rate of the network system in the least amount of time. Thereby, the root then is able to send its resource management cells at the minimum explicit cell rate of the entire network system.

By using this multicast system on a network, flow control is assured. This flow control provides that all destinations receive all cells from the source. Which in turn requires that that the source be controlled to the minimum rate supported by all destinations in an expedited means on the reverse path.

Many changes, modifications, variations, and other uses and applications of the subject invention will, however, become apparent to those skilled in the art after considering the specification and the accompanying drawings which disclose preferred embodiments thereof. All such changes, modifications, variations, and other uses and applications which do not depart from the spirit of the invention are deemed to be covered by the invention which is limited only the claims that follow:

Applicant claims the following:

1. A method of congestion avoidance on a network using a multicast system;

wherein said network comprises:

at least one source node on said network transmitting a resource management cell on a forward path of said network;

byte fields on said resource management cell, said fields include a field detailing an explicit cell rate initially set by said at least one source node;

at least one switch node; and at least one destination node; and the method comprising the steps of:

receiving said resource management cell on the forward path of said network at said switch node;

creating at each said switch node a copy of said resource management cell;

transmitting said copy on said forward path on each branch of said network at each said switch node;

creating at each said switch node an extra duplicate of said resource management cell or copy of said resource management cell, received on said forward path;

transmitting at each said switch node said extra duplicate on a reverse path of said network;

transmitting at each said destination node said copy of said cell, received by each said destination node, on a reverse path of said network;

receiving at each said switch node any said cell on branch of each said switch node on said reverse path;

setting at said switch node said field detailing said explicit cell rate of said extra duplicate of said cell by each said switch node with the minimum of a prior minimum explicit cell rate or an explicit cell rate of said cell received by said switch node on said reverse path;

discarding each said cell received at each said switch node on said reverse path after said explicit cell rate of said cell has been evaluated by each said switch node; and setting a rate of a data cell and said resource management cells transmitted by said source node at said explicit cell rate of said extra duplicate of said cell received at said at least one source node.

2. A method of congestion avoidance on a network according to claim 1 and further comprising the steps of discarding any said cell on said forward path when each said switch node receives said cell.

3. A method of congestion avoidance on a network according to claim 1 and further comprising the steps of: discarding any said cell on said forward path when each said switch node receives said cell when a counter of said switch node is not equal to zero.

4. A method according to claim 3 and further comprising the steps of: setting said counter to a value N when each said switch node receives said cell when said counter equals zero.

5. A method according to claim 4 and further comprising the steps of: retaining said cell when said counter is equal to zero.

6. A method according to claim 4 and further comprising the steps of: decreasing said value N by one every time said resource management cell on the forward path from said at least one source node is received by each said switch node.

7. A method according to claim 1 and further comprising the steps of: setting said extra duplicate of said cell at each said switch node with a minimum of a combined information of said cell on said reverse path that a bandwidth of a trunk of said network can support.

8. A method according to claim 1 and further comprising the steps of: setting said extra duplicate of said cell at each said switch node with a maximum of a combined information of said cell on said reverse path that a bandwidth of a trunk of said network can support.

9. A method according to claim 1 and further comprising the steps of: setting said extra duplicate of said cell at each said switch node with a standard deviation of a mean of a combined information of said cell on said reverse path that a bandwidth of a trunk of said network can support.

10. A method according to claim 1 and further comprising the steps of: setting said extra duplicate of said cell at each said switch node with a predetermined ratio of a combined information of said cell on said reverse path that a bandwidth of a trunk of said network can support.

11. A multicast system of congestion avoidance on a network loop comprising:

at least one designation node;

at least one source node on said network loop transmitting a resource management cell on a forward path of said network;

byte fields on said resource management cell, said fields include a field detailing an explicit cell rate initially set by said at least one source node;

a first switch node receives said resource management cell on a forward path of said network loop, then said first switch node creates a copy of said resource management cell and transmits said copy on said forward path on each branch of said network at said first switch node;

a second switch node that receives said copy on said forward path clones said copy and transmits said copy on said forward path on each branch of said network at said second switch node;

said at least one destination node transmits said copy of said cell, received by said destination node, on a reverse path of said network;

each said first and said second switch nodes makes an extra duplicate of said resource management cell received on said forward path and transmits said extra duplicate on the reverse path of said network;

each said first and said second switch nodes receives any said cell on said reverse path and sets said field detailing said explicit cell rate of said extra duplicate of said cell by said switch node with the minimum of a prior minimum explicit cell rate or an explicit cell rate of said cell received on said reverse path and then discards each said cell received on said reverse path after said explicit cell rate of said cell has been evaluated by respective said first and second switch nodes; and a rate of a data cell and said resource management cells transmitted by said at least one source node are set at said explicit cell rate of said extra duplicate of said cell received at said at least one source node.

* * * * *